Figure 1:
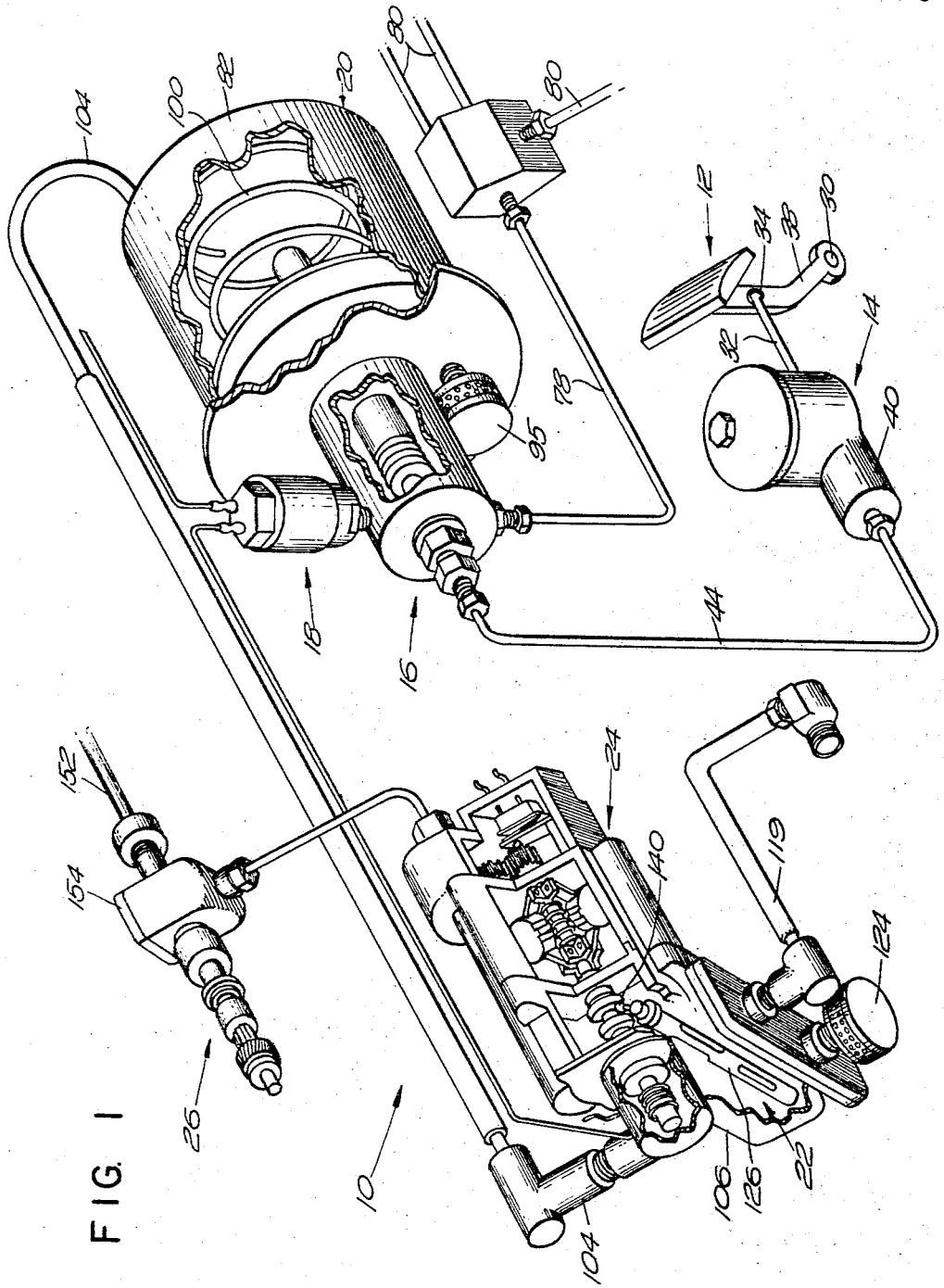

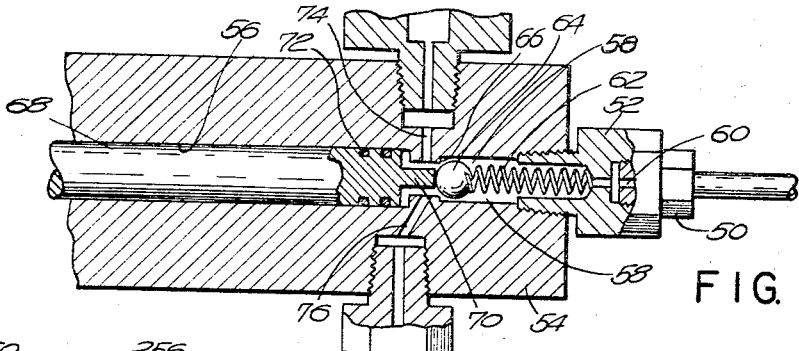
FIG. 3
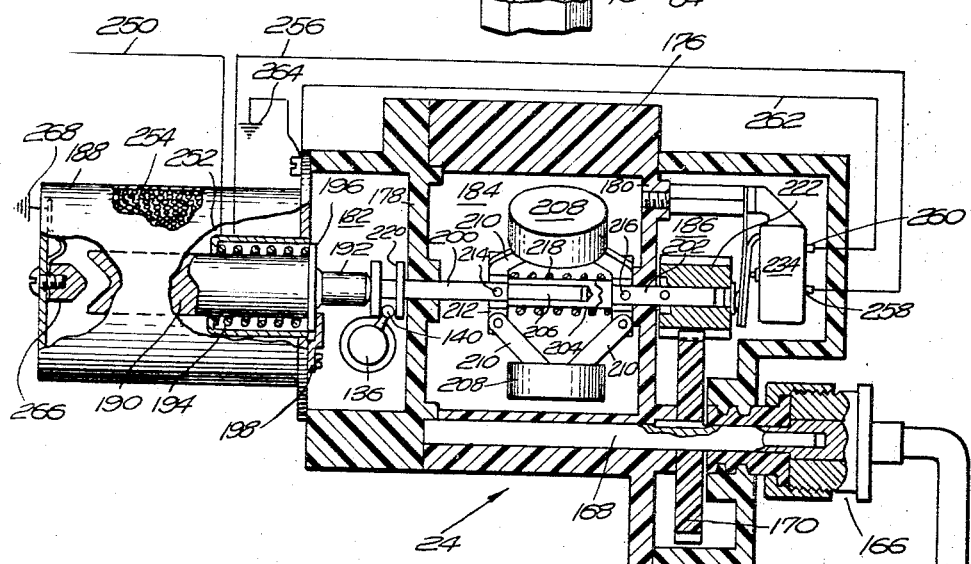
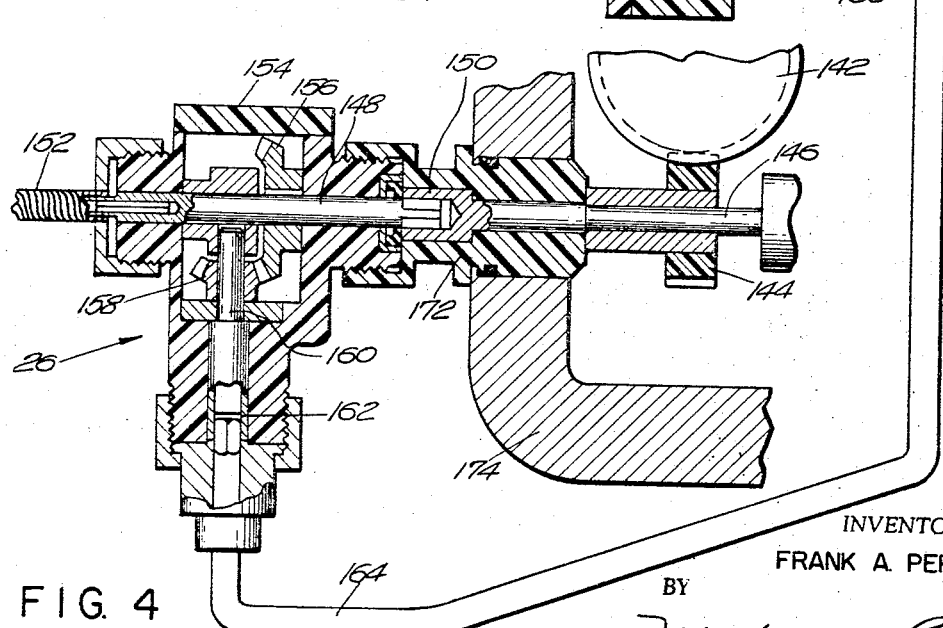
FIG. 4
INVENTOR.
FRANK A. PERRINO
BY
Marshall J. Breen
ATTORNEYS

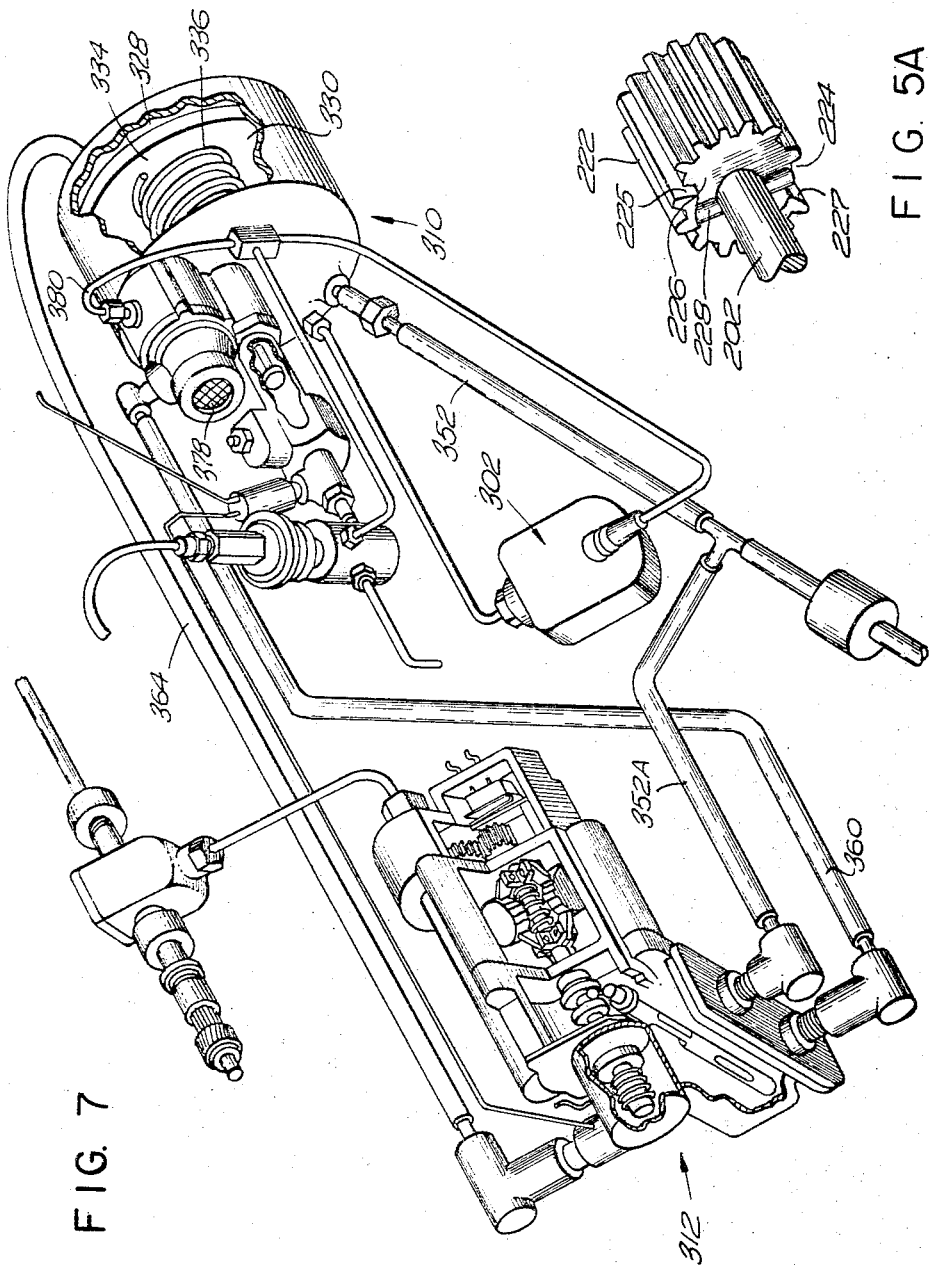

INVENTOR.
FRANK A. PERRINO
BY
Marshall J. Breen
ATTORNEYS

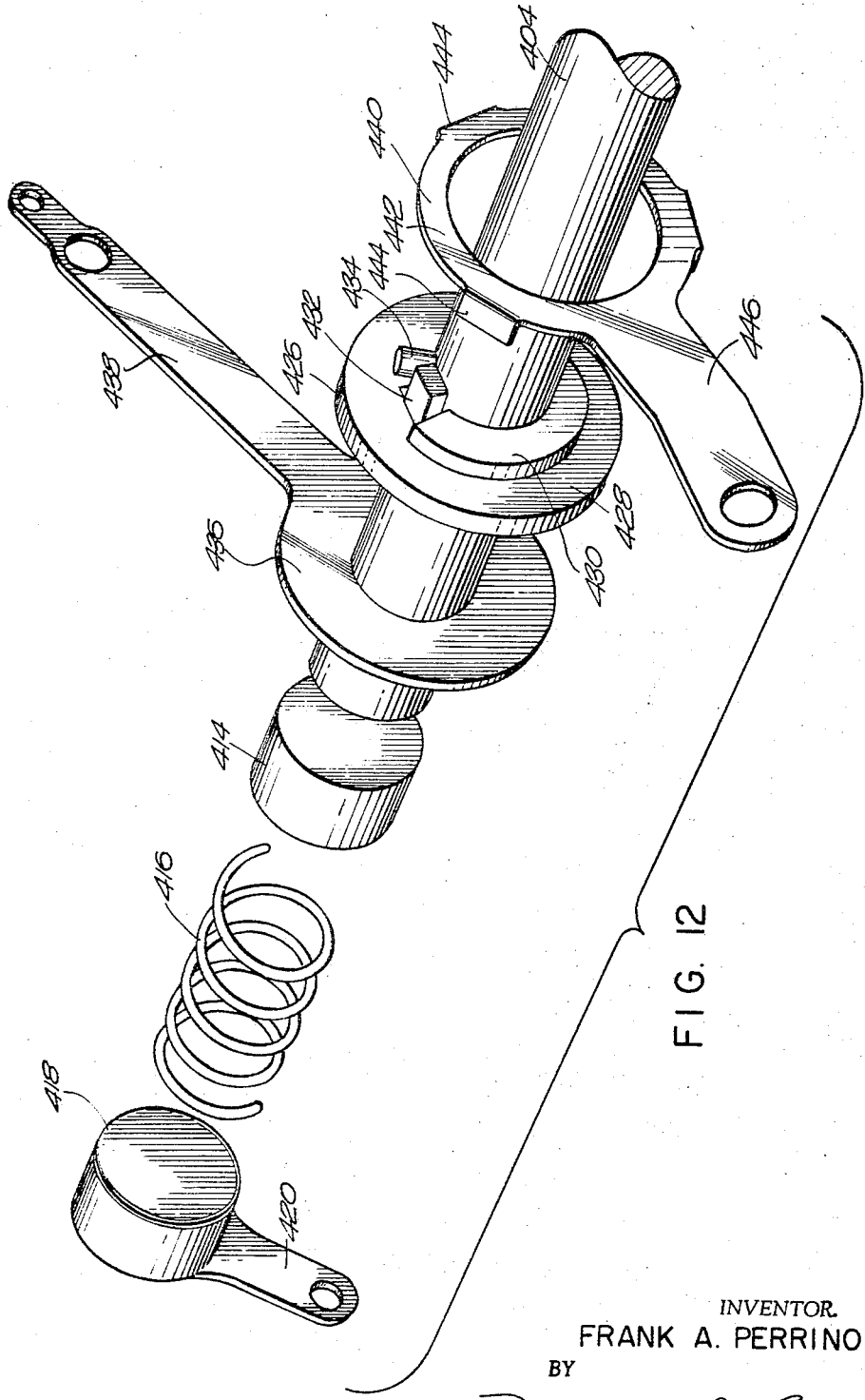

United States Patent Office 3,330,113
Patented July 11, 1967

3,330,113
POWER BRAKES
Frank A. Perrino, North Attleboro, Mass., assignor, by mesne assignments, to The Singer Company, New York, N.Y., a corporation of New Jersey
Original application Nov. 2, 1964, Ser. No. 409,350. Divided and this application Aug. 5, 1966, Ser. No. 581,675
9 Claims. (Cl. 60—54.5)

This is a division of application Ser. No. 409,350, filed on Nov. 2, 1964, and entitled Braking System and Anti-Skid Means Therefor.

The present invention relates generally to braking systems for automotive vehicles and the like and is particularly concerned with the provision of novel and improved anti-skid means.

It is well known that a skid condition may be encountered by a moving vehicle where the brakes of the vehicle are applied so hard that the vehicle wheels tend to lock. Quite obviously, other factors affect the commencement and existence of a skid condition, such as the condition of the surface on which the vehicle is moving, the speed at which the vehicle is traveling, etc. However, it is possible for a vehicle to commence a skid even where the surface on which the vehicle is traveling is not wet or icy and even where the vehicle is traveling at moderate speeds, if the vehicle brakes are applied too hard. Since all control of a vehicle is lost while the vehicle is in a skid, thus increasing the danger of serious accident and personal injury, it is obviously highly desirable to prevent or reduce skidding while at the same time enabling the vehicle to come to a complete stop as quickly as possible.

It is therefore a primary object of the present invention to provide an improved braking system wherein operation of the brakes is under control of the vehicle operator until a skid condition commences to exist, at which time anti-skid means automatically take over complete control of the brakes and maintain said control until danger of skidding no longer exists, whereupon the brakes are returned to normal control by the operator.

Another object of my invention is the provision of efficient and sensitive control means for the various operations of the systems, which have usefulness in other types of systems as well.

Another object of my invention is the provision of novel and improved anti-skid means equally adaptable to so-called power brakes, as well as nonpower brakes.

A further object of my invention is the provision of anti-skid means of the character described wherein the vacuum system of the vehicle is utilized, but wherein the loss of vacuum in no way interferes with control of the vehicle brakes by the operator.

A further object of my invention is the provision of anti-skid means that is readily and easily adaptable to existing vehicles.

Another object is the provision of a novel and improved reverse cut-off switch that automatically renders the anti-skid means inoperative when the vehicle moves in reverse.

Still another object of my invention is the provision of an anti-skid system for automotive vehicles and the like having means which are durable and effective in operation and which are feasible and practical both from an economic and manufacturing standpoint.

Other objects, features and advantages of my invention will become apparent as the description thereof proceeds when considered in connection with the accompanying illustrative drawings.

Figure 2:
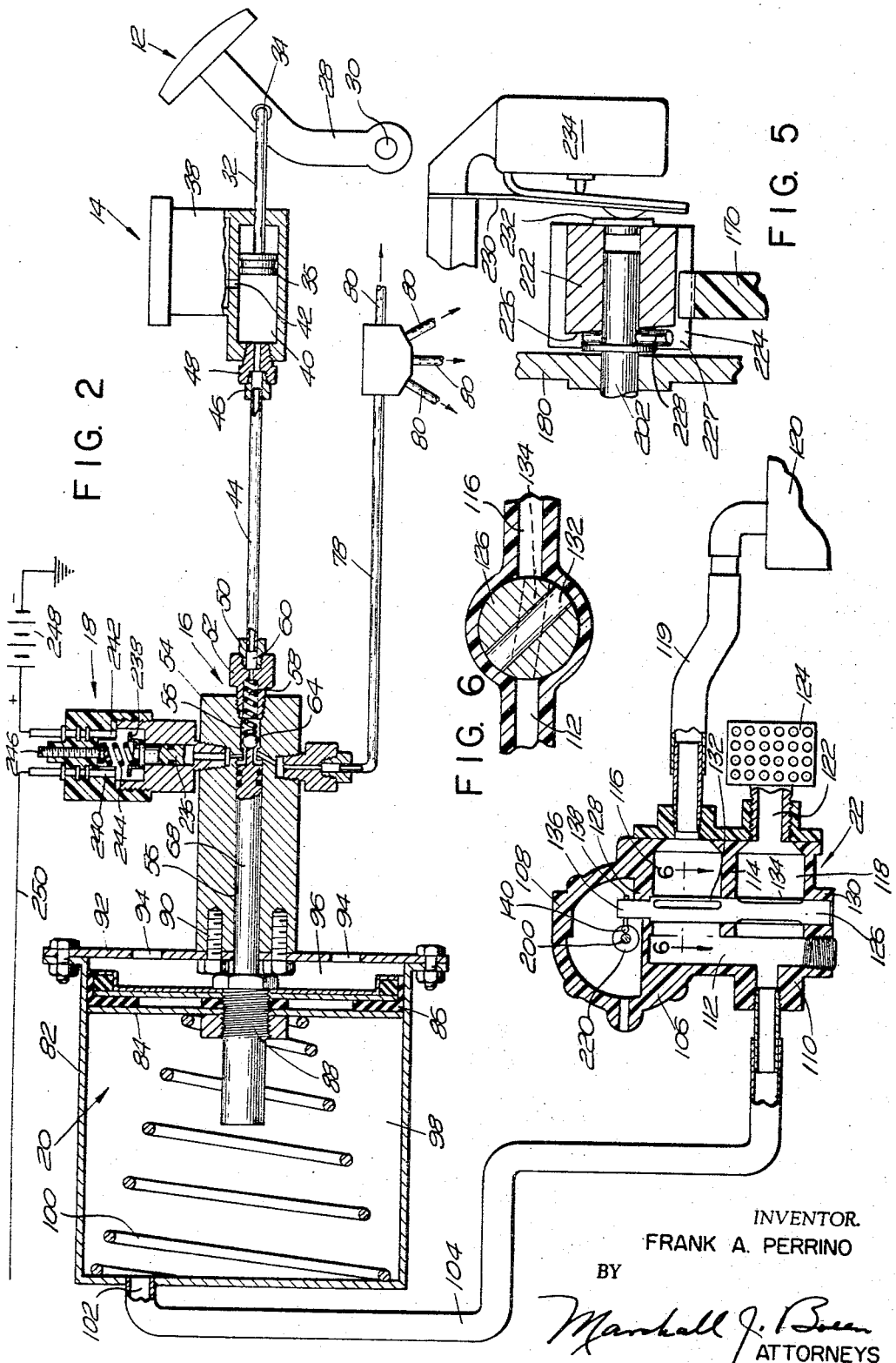
Figure 8:
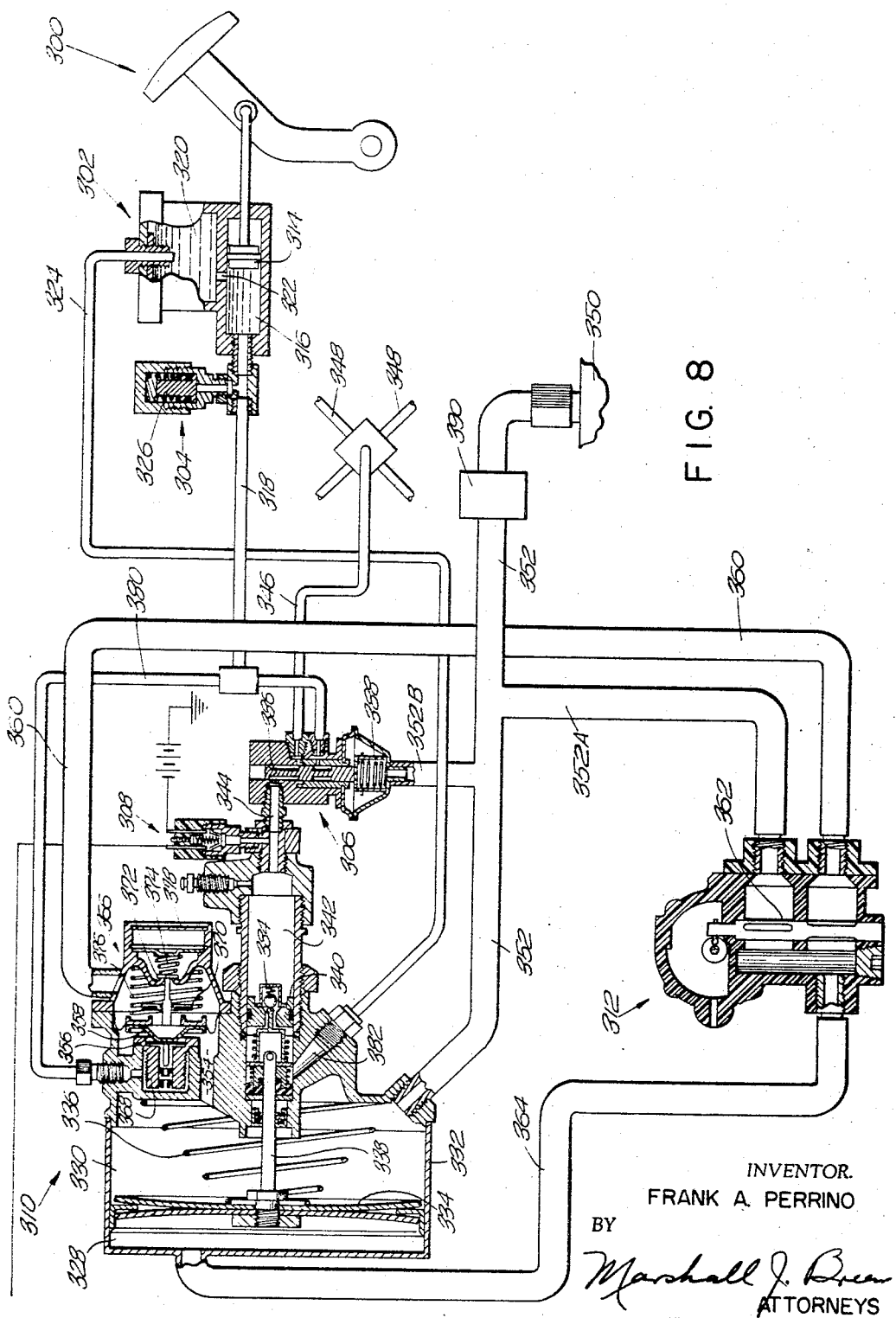
Figure 9:
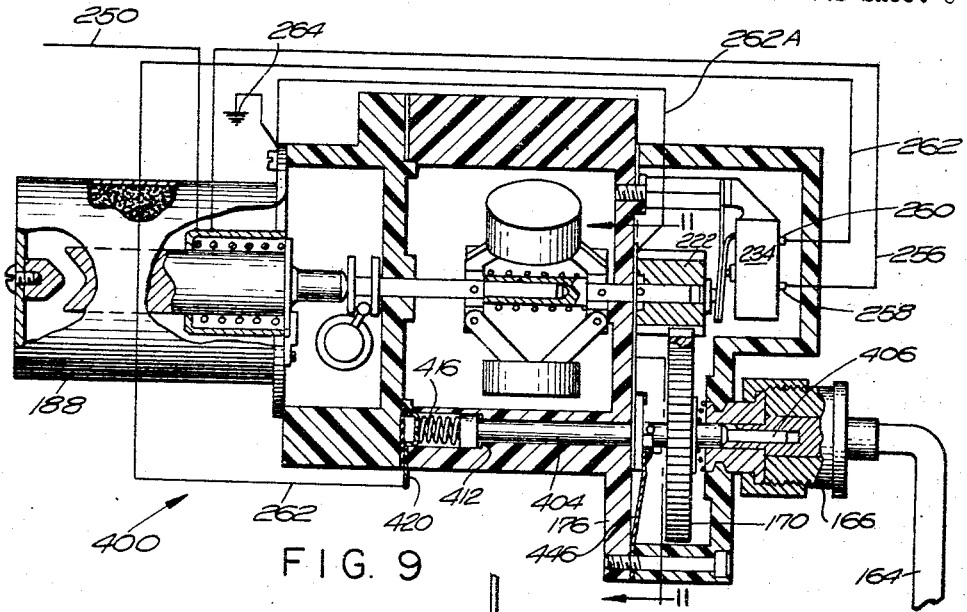
Figure 10:
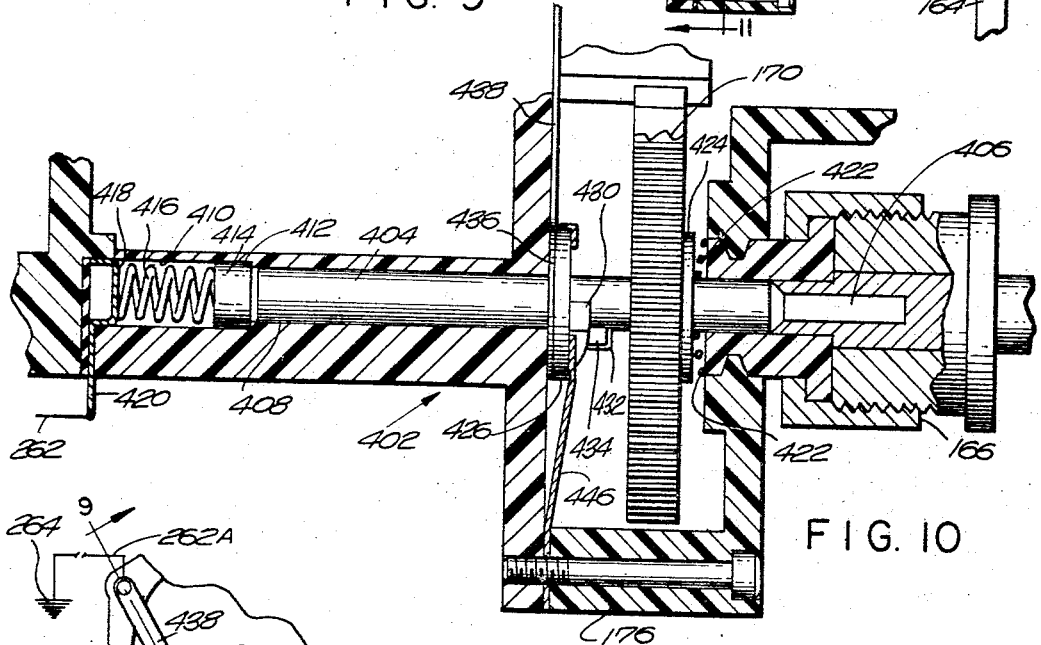
Figure 11:
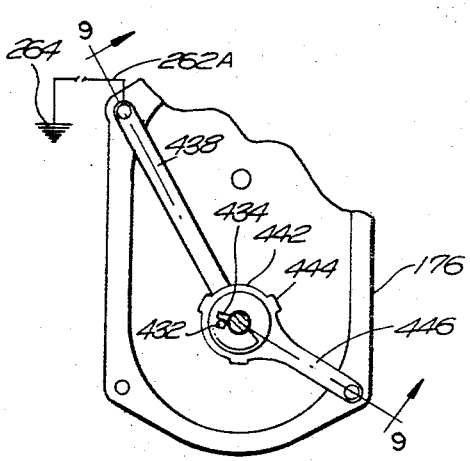

In the drawings which illustrate the best mode presently contemplated for carrying out the present invention:
FIG. 1 is a diagrammatic view, in perspective, of the assembly utilized in my nonpower unit, with portions being broken away for purposes of illustration;
FIG. 2 is an elevational view, in section, of a portion of the overall assembly illustrated in FIG. 1;
FIG. 3 is an enlarged fragmentary sectional elevation of a portion of the brake-actuating means illustrated in FIG. 1;
FIG. 4 is an enlarged fragmentary sectional elevation illustrating certain details of the anti-skid unit and the drive means therefor;
FIG. 5 is an enlarged sectional elevation of the cam gear and solenoid-actuating switch which form a part of the anti-skid unit;
FIG. 5A is an enlarged fragmentary perspective view of the cam gear;
FIG. 6 is an enlarged section taken on line 6—6 of FIG. 2;
FIG. 7 is a diagrammatic view, in perspective, of my anti-skid means in combination with a power brake unit, portions being broken away for purposes of illustration;
FIG. 8 is an elevational view, in section, of the power brake assembly illustrated in FIG. 7;
FIG. 9 is an enlarged fragmentary sectional elevation illustrating certain details of the anti-skid means and the reverse cut-off switch in combination therewith;
FIG. 10 is an enlarged fragmentary sectional elevation of the reverse cut-off switch per se;
FIG. 11 is a fragmentary section taken on line 11—11 of FIG. 9; and
FIG. 12 is an enlarged exploded perspective view of the reverse cut-off switch per se.

According to one aspect of my invention, a sensing means for sensing when a skid condition begins is caused to activate a wheel speed-sensitive device that takes over control of the brake pressure until the skid condition ends. Advantageously, the sensing means is an inertia-responsive means that senses a sudden change in the speed of rotation of a wheel at the commencement of skid conditions. This inertia-responsive device does not control the brake pressure itself by repeated action during the skid condition, as has been attempted by the prior art. Instead the control of the brake pressure is taken over completely by a governor driven dependently with the wheel, advantageously a mechanical governor. The governor then controls the brake pressure in a hunting or modulating manner, for an extended period, until such control of the brakes is ended by a reset means that responds to slowing of the vehicle to a predetermined speed. Preferably, the reset means is a brake-pressure-sensitive device which senses reduction of brake pressure to a predetermined level which the governor can produce only when it slows to the predetermined speed.

This separation of the initiating and controlling functions is an extremely important feature. The initiating device must necessarily have a restraint to prevent operation when the vehicle merely decelerates normally. I have realized that such a restraint prevents the device from being able to effectively regulate the brake pressure due to lack of sensitivity. The governor, after it takes over control, is free of such restraint and therefore can have much greater sensitivity with the result that the brake pressure can be much more accurately regulated.

The reset device is also of critical importance because at low speeds, e.g., below 10 m.p.h., the governor forces can become so diminished that the governor can behave entirely as if the vehicle were skidding, though not, thereby totally relieving the brake pressure. The reset device can act before this occurs, whereby normal control is regained.

A further aspect of my invention concerns the realisation that a predetermined level of brake pressure, e.g., the minimum brake pressure at which skidding of the vehicle will occur on ice, generally between 100–150 p.s.i. for conventional automobiles, can be utilized to determine the setting for the brake pressure-sensitive reset device. Thereby, only at the time when skidding is no longer possible will control be taken away from the anti-skid unit to return the brake system to normal operation. This pressure-sensitive device, particularly when taking the form of a brake fluid pressure-sensitive switch, is useful with anti-skid systems generally, though of particular usefulness in the system described above.

Advantageously, the brake pressure-sensitive switch operates an electrical system, preferably a solenoid, to restore normal brake operation, and it can be employed to bring the anti-skid unit into readiness whenever the operator applies his brakes, as well as to stop the anti-skid unit from acting when skid conditions have ended.

Another aspect of the invention concerns the control of the governor. In normal operation of the brakes, the governor is prevented from influencing the brakes, but once activated, e.g., by the inertia-sensitive device, it is made continually to act, even when the vehicle wheel speeds up after the brakes have been initially relieved. A controlling or restraining member, preferably a solenoid, is employed to achieve this operation, with the controlling member held steadily from interfering with the governor until the reset device operates. In the case where a rotary weight mechanical governor is employed, a plunger can normally restrain the governor and a solenoid, initially under the control of the inertia-responsive device, can pull back the plunger to free the governor, whereupon the plunger can operate a switch to maintain the solenoid energized, and at the end of skid conditions the reset device can de-energize the solenoid to once again restrain the governor.

Another aspect of the invention is a fluid valving system that responds to the governor to increase and decrease brake pressure. Advantageously, the valve, discharging to a brake control conduit, is moved by the governor alternately between two positions to connect two passages for fluid at different pressures to the conduit. This causes the brake pressure to rapidly vary in a modulating or hunting manner, to keep the brake pressure at maximum values while preventing skidding. The mean about which the pressure modulates changes as the slipperiness of the road changes, due to the effect such road changes have upon the governor.

For use in a closed-circuit hydraulic system, the direct control of the brakes is achieved, according to the invention, by an isolation valve that continually seals the wheel brake from the control of the operator, and a variable volume chamber, e.g., piston and cylinder, for relieving and reapplying brake pressure to the wheel, the piston modulating about a mean determined by the modulating pressure conditions of the brake control conduit. Advantageously, the piston, at the position where it allows full pressure, can operate the isolation valve. Then the piston being spring loaded to that position can also perform a pressure-limiting function, limiting brake pressure to, e.g., 1,000 p.s.i., though the operator is capable of applying twice that much. In normal operation the brakes function as well at 1,000 p.s.i. as above, and by so limiting the brake pressure, less pressure is present to be relieved when a skid occurs, which enables faster action and allows the relief chamber to be smaller.

In other brake systems the brake control conduit can control a power unit, or in the case of air brakes, it can directly control the brake actuators associated with the wheels.

Furthermore, according to the invention, I have provided advantageous and improved constructions of the various operating components and sub-systems which can best be described with reference to the drawings.

Referring now to the drawings, and more particularly to FIGS. 1–6 thereof, a closed hydraulic circuit braking system employing my novel and improved anti-skid means in combination with a so-called nonpower brake will be described. The over-all system, generally designated as 10, comprises brake pedal 12, master cylinder 14, brake-relieving device 16, hydraulic pressure switch 18, relief actuator means 20, conduit valve means 22, skid-sensing and control means 24, and anti-skid unit drive means 26.

Referring to FIGS. 1 and 2, the brake pedal 12 is of conventional construction and comprises bell crank 28 pivotally connected to a suitable support on the vehicle (not shown) at 30 whereupon depression of pedal 12 causes bell crank 28 to rotate in a counterclockwise direction around pivot point 30, thus actuating connecting rod 32 pivotally connected to bell crank 28, as at 34. Rod 32 carries at its other extremity a piston 36 which functions to pump oil or other suitable fluid from master cylinder 14, all in a well-known manner. Specifically, master cylinder 14 has an upper reservoir 38 which communicates with lower chamber 40 by means of opening 42 whereupon a full supply of oil is always present in the chamber 40 to be pumped by actuation of pedal 12 and piston 36.

Fluid pumped from master cylinder 14 passes through a conduit 44 connected at one of its extremities by suitable couplings 46, 48 to chamber 40 of master cylinder 14 and at its other extremity by a suitable coupling 50 to the brake-relieving device generally designated at 16, which incorporates an isolation valve. More specifically, coupling 50 is connected to a second coupling 52 which is threadedly attached to block 54, said block having a bore 56 extending longitudinally therethrough into communication with aligned longitudinally extending bores 58 and 60 in couplings 52 and 50, respectively.

As will be seen most clearly in FIGS. 2 and 3, coupling 52 is provided with an internal shoulder for receiving positioning spring 62 which positions isolation valve ball 64 adjacent valve seat 66, tending to close with slight force the bore or passageway 56. During normal operation of the vehicle, ball 64 is maintained in its unseated position, as illustrated in FIGS. 2 and 3, against the action of spring 62, by means of spring-loaded actuator piston 68 having a reduced extension 70 in engagement with ball 64. Suitable O-rings or the like 72 are provided to insure a tight sliding fit between piston 68 and bore 56 whereby said piston effectively blocks further flow of fluid through bore 56.

Block 54 is provided with a pair of oppositely disposed passageways 74 and 76, it being noted that said passageways communicate with bore 56 just behind valve seat 66, whereupon when ball 64 is in its closed position in engagement with valve seat 66, fluid in conduit 44 from the master cylinder will be blocked before reaching the passageway 74 and 76. Passageway 74 communicates with hydraulic pressure reset switch 18 for reasons hereinafter to be described, while passageway 76 communicates by means of suitable couplings with conduit 78, which in turn communicates with the hydraulic brake lines 80 leading to the wheel hydraulic actuator cylinders (not shown) of the vehicle to actuate the brakes in well-known fashion. Thus it will be seen that with the parts in the positions illustrated in FIGS. 2 and 3, and particularly with piston 68 in the position illustrated, brake pedal 12 controls actuation of the vehicle brakes through a direct line. This is the normal operating condition of the vehicle.

The actuator for the relieving device 16, generally designated at 20 (FIGS. 1, 2) controls the movement of piston 68 and hence ball 64. This actuator comprises a housing or cylinder 82 having a large piston 84 slidably mounted therein, said piston having suitable seals 86 at its outer periphery to insure that the piston 84 will make a tight sliding fit within cylinder 82 whereby no leakage will exist around the piston. Piston 84 is threadedly connected, as at 88, to the aforementioned small hydraulic piston 68, whereupon movement of large piston 84 causes corresponding movement of piston 68. Housing 82 is secured to block 54 by any suitable means, such as screws 90, and the adjacent end wall 92 of the housing 82 is in free communication with atmosphere, as by ports 94. Suitable air filters, such as shown at 95 in FIG. 1, may be associated with the ports 94. It will thus be seen that the chamber 96 located on one side of large piston 84 is always at atmospheric pressure, while chamber 98, located on the opposite side of piston 84, may either be at atmospheric pressure or it may be vacuum charged, as will hereinafter be described in more detail. When the chambers 96 and 98 are both at atmospheric pressure, spring 100 resiliently urges piston 84 to the position illustrated in FIG. 2, it being seen that the piston 84 has moved to the right as far as it can go. In this position, the piston 68 has also been axially moved to the position illustrated, in which position extension 70 (FIG. 3) has engaged ball 64 to unseat it from valve seat 66. Thus, where chambers 96 and 98 are both at atmospheric pressure, the vehicle brakes are under the complete control of the brake pedal 12. However, when chamber 98 is vacuum charged, the pressure differential between chambers 96 and 98 is sufficient to overcome spring 100, whereupon piston 84 will move to the left, viewing FIG. 2, thus causing corresponding movement to the left of piston 68. This in turn enables ball 64 to seat against valve seat 66, by means of spring 62, thus blocking the bore 56 and preventing actuation of the brakes by means of brake pedal 12. As pistons 84 and 68 move further to the left due to the presence of a vacuum or even a partial vacuum in chamber 98, hydraulic pressure in lines 78 and 80 and in the spring-loaded brake actuators associated with the vehicle wheels will be relieved, due to the fact that the fluid is now free to back up into that portion of bore 56 that has been vacated by movement of piston 68 to the left. It will therefore be seen that by introducing a vacuum or partial vacuum to chamber 98, fluid pressure in lines 78 and 80 will automatically be relieved, thereby relieving the brakes. By the same token, as soon as atmosphere is again introduced to chamber 98 to equalize the pressure in chamber 96, the brakes can once again be fully actuated by the pedal 12. It will be apparent that the amount of vacuum introduced to chamber 98 will determine the amount of reduction in brake pressure. More specifically, the greater the vacuum that is introduced to chamber 98, the greater will be the movement of piston 84 to the left (viewing FIG. 2) and at the same time there will be greater movement of piston 68 to the left, thus vacating more of bore 56 and providing greater relief of the hydraulic brake pressure. Similarly, given a certain amount of relief due to a certain amount of vacuum, then decrease in the amount of vacuum will increase the hydraulic brake pressure due to movement of the pistons to the right. The ability of my system to provide varying degrees of relief and restoration of brake pressure while the brake pedal remains isolated from the system is an important and advantageous feature.

It will be noted that during normal operation of the system, as heretofore described, i.e., where atmospheric pressure exists in both chambers 96 and 98, the piston 68 will function as a pressure limiter in the system. More specifically, since the piston 68 is resiliently held in the position illustrated in FIG. 2 by means of spring 100, it will back off when excess pressure is applied by foot pedal 12. In practice it has been found that in a conventional automobile pressure above 1,000 p.s.i. or at least above 1,500 p.s.i., depending on the type of vehicle, is unneeded for normal brake operation and hence springs 62 and 100 are preferably calibrated so as to enable ball 64 to seat when pressure in excess of that needed is introduced, thus preventing introduction of excessive pressure to the brakes. It will be obvious that the springs may be calibrated so as to provide a limit at any selected pressure.

The means for introducing either atmospheric pressure or vacuum to chamber 98 and for modulating the degree of vacuum therein will now be described. Referring to FIG. 2, it will be seen that cylinder housing 82 is provided with an opening 102 in communication with chamber 98, which opening communicates with a brake control conduit 104 that in turn connects with the conduit valve, generally designated at 22. More specifically, there is provided a housing 106 having an upper portion 108 which houses the skid-sensing and control means 24, and a lower portion 110 which houses the valve 22. The lower housing 110 comprises an inner chamber 112 having a partition 114 defining a vacuum passage 116 and an atmosphere passage 118. More specifically, vacuum passage 116 is in communication, by means of passage 119, with the intake manifold 120 of the vehicle. Thus, suction is constantly being applied to the passage 116. The pasasge 118, on the other hand, is in communication with atmosphere through port 122, to which a suitable air filter 124 may be attached, if desired. A rotary valve 126 is mounted for rotation in housing 106, it being noted that valve 126 is an elongated rod that extends vertically through upper partition 128, the aforesaid partition 114, and is journaled in bottom wall 130, the partition and wall being integral parts of a unique molded housing of anti-friction plastic. The valve 126 is provided with a pair of passageways or bores 132 and 134 extending diametrically therethrough, said bores being vertically spaced from each other, and having elongated cross-sections in the axial direction, longer than the diameter of the rod. Bore 132 is associated with passage 116 and bore 134 with passage 118. The bores are angularly disposed with respect to each other, as shown most clearly in FIG. 6. Thus, with the rotary valve 126 in the position illustrated in FIGS. 2 and 6, bore 134 is positioned so as to allow free passage of atmosphere from passages 122 and 118, bore 134 and chamber 112 to brake control conduit 104, whereby atmosphere will flow into chamber 98. At the same time, due to the angular displacement of bore 132, passage 116 will be closed by valve 126, thus preventing suction from manifold 120 and passage 119 from coming into contact with chamber 112 and brake control conduit 104. It will be understood that the only access from passage 116 and 118 to chamber 112 is through valve 126 and more specifically, the bores 132, 134 thereof. Should valve 126 be rotated by means hereinafter to be described, it will be seen that communication between passage 118 and chamber 112 will eventually be blocked, thus interrupting the flow of atmosphere to brake control conduit 104, while at the same time passage 116 will be in communication with chamber 112, whereupon a suction will be applied through brake control conduit 104 to chamber 98.

It is important to note that use of a rotary valve such as valve 126 is extremely advantageous where passage of a vacuum and atmospheric pressure, or more generally two different pressures, is being controlled due to the fact that the pressure differential offers a minimum of resistance to the turning movement of the small diameter valve. This is contrasted to a reciprocal or poppet type valve wherein movement of the valve is much more resisted by pressure differential.

As hereinbefore explained and described, introduction of a vacuum or partial vacuum to chamber 98 automatically tends to release brake pressure on the vehicle wheels. It has been found in practice that an angular displacement between bores 132 and 134 of approximately 37.5° gives best results in the operation of my system, and it will be understood that rotary valve 126 may not always be positioned so as to completely open or close the bores 132 and 134. Thus, different degrees of movement of valve 126 allow different brake fluid pressures to be exerted on the vehicle wheels, thus providing the proper braking pressures for different road conditions. In instances where the pressure on the brake actuator is the same at the beginning of a skid, (lesser initial pressure requires less relieving), the amount of relief of the brake pressure depends on the amount of travel of piston 84 to the left in chamber 98 which in turn is dependent on the amount of vacuum introduced to the chamber. Thus, where the vehicle is braked and skids on a dry surface which requires a greater brake pressure to create a skid condition, lesser movement of piston 84 to the left, and hence less vacuum, will be required to relieve the brake pressure sufficiently to prevent the vehicle wheels from locking, this pressure being referred to as "release" pressure. Conversely, where the vehicle is braked or a slippery surface such as ice, a lesser brake pressure is required to create a skid condition. Hence the valve 126 must open suction passage 116 to the brake control conduit 104 for a longer initial period to provide greater vacuum to chamber 98 in order to move piston 84 sufficiently to the left so that sufficient relief of the brake pressure will be effected to prevent the wheels from locking.

In accordance with the invention after release pressure is attained, with corresponding movement of the piston then the governor causes the degree of vacuum in conduit 104 to modulate, which modulates the brake pressure through a narrow range of intermediate pressures above and below the release pressure, without ever restoring the normal, higher brake pressure until the skid condition ends.

To thus operate the valve, the upper extremity of valve 126 (FIG. 2) is provided with a reduced portion 136 that extends upwardly through partition 128, said portion 136 having a pin 138 extending therethrough to which is attached a circular projection 140, it being seen that as a longitudinal thrust is exerted against projection 140, the valve 126 will be caused to rotate.

The means for controlling movement of valve 126, namely, the skid-sensing and governor control means and the drive means therefor, will now be described. Referring to FIG. 4, skid-sensing and governor control means is designated generally at 24, and the drive means therefor is designated generally at 26. Referring first to the latter, the vehicle drive shaft is shown at 142, it being understood that the drive shaft is directly connected to the wheels of the vehicle (not shown) whereupon when the vehicle wheels lock, the drive shaft also locks. The drive shaft drivingly engages speedometer gear 144, which in turn is fixed to shaft 146, which in turn is drivingly connected to shaft 148 by means of a coupling shown at 150, said shaft 148 connecting with speedometer cable 152. Gear box 154 through which shaft 148 passes and in which the shaft 148 is suitably journaled, houses drivingly engaged bevel gears 156, 158, it being understood that bevel gear 156 is keyed to shaft 148 and bevel gear 158 is keyed to shaft 160, whereupon rotation of shaft 148, transmitted thereto by the vehicle drive shaft 142, is transmitted to shaft 160. Shaft 160, in turn, is drivingly interconnected, as at 162, to flexible shaft 164, said flexible shaft being connected, as at 166, to the unit 24, and said flexible shaft being drivingly interconnected with a shaft 168 which has fixed thereto a drive gear 170. It will therefore be seen that the gear 170 is drivingly interconnected with the vehicle drive shaft 142, which in turn is connected to the vehicle wheels. Thus, rotation of the vehicle wheels will cause corresponding rotation of gear 170, and, conversely, sudden slowing of the vehicle wheels, such as would occur where the vehicle approaches a skid condition by the operator applying more brake pressure than is required for a particular road surface, will cause not only the main drive shaft 142 to suddenly slow, but also drive gear 170. Gear box 154, and adaptor 172, by means of which the gear box is connected to the engine housing 174, comprise an assembly which may be easily and readily adapted to a conventional vehicle for driving the sensing and governor control means now to be described.

The unit 24 (FIGS. 1, 4) comprises a molded plastic housing 176 having a pair of spaced partitions 178, 180 therein defining chambers 182, 184 and 186. A solenoid 188 is secured to housing 176 adjacent chamber 182 by any suitable means, the solenoid 188 having a plunger 190 with a reduced extension 192 resiliently urged into chamber 182 by means of spring 194. When solenoid 188 is not energized, spring 194 bears against flange 196 affixed to plunger 190 to resiliently urge extension 192 into chamber 182. Suitable stop means 198 mounted on the interior of chamber 182 engaged flange 196 to limit resilient axial movement of plunger 190 and extension 192 at a predetermined point, for reasons hereinafter to be explained more fully. Journaled in the partitions 178 and 180 are a pair of aligned shafts 200 and 202, respectively. Shaft 202 is provided with an enlarged portion 204 having an internal bore for slidably receiving in telescoping relation a reduced extension 206 of shaft 200. Attached to shafts 200 and 202 is a governor assembly comprising a plurality of weights 208, each pivotally connected to a pair of links 210, which links in turn are pivotally connected to arms 212. The arms 212 located on one side of the weights 208 are affixed to shaft 200 as at 214, while the arms on the other side of the weights are affixed to shaft 202 as at 216. As hereinbefore pointed out, shaft 202 is journaled for rotation in partition 180 but is incapable of longitudinal movement. Shaft 200, on the other hand, is drivingly engaged with shaft 202 so as to rotate therewith, but said shaft 200 is axially slidable with respect to the said shaft 202. Since the governor assembly is affixed on one side to shaft 202 and on the other side to shaft 200, it will be seen that the speed of rotation of the shafts will determine their longitudinal position relative to each other. Spring 218 resiliently urges the governor assembly to its collapsed position wherein shafts 200 and 202 are axially extended with respect to each other, but as the rotational speed of shafts 200 and 202 increases, centrifugal force urges the weights 208 outwardly, thus moving shaft 200 toward the right, viewing FIG. 4, against the action of spring 218.

Fixed to shaft 200 at the extremity thereof located in chamber 182 is a spool member 220, which spool member is in engagement with projection 140 carried by the reduced upper extension 136 of rotary valve 126. Thus, axial movement of shaft 200 causes like movement of the spool 220 which in turn carries therewith projection 140 captured between the opposed walls of the spool to thereby impart rotary movement to valve 126.

The means for imparting rotational movement to shafts 200 and 202 and the governor assembly associated therewith comprises a cam gear 222 (FIGS. 4, 5 and 5A), which cam gear is part of the drive train, in driven engagement with drive gear 170. The cam gear 222 is mounted on shaft 202 and is located in chamber 186. The cam gear is slidably mounted on shaft 202 and is in driving engagement therewith by means now to be described. A recess 224 having inclined or helical surface 226 is provided at the end of the cam gear adjacent partition 180, and a projection or pin 228, carried by shaft 202, extends into said recess in engagement with the cam surface 226. At either end of the recess is a stop surface, at the deeper end stop surface 227, adapted to engage pin 228 for accelerating the governor and at the shallower end stop surface 225 for engaging pin 228 to decelerate the governor. A leaf spring 230 mounted to the housing 176 by any suitable means engages a button 232 which is press fitted into the central bore of cam gear 222 to normally urge the latter axially toward partition 180, holding pin 228 against accelerating stop surface 227. However, when rotation of drive gear 170 and cam gear 222 is suddenly slowed, as by sudden slowing of the vehicle wheels upon the presence of a skid condition, the rotational inertia of shaft 202, especially due to the governor weights 208, causes shaft 202 to turn ahead of gear 222, causing pin 228 to leave stop surface 227 and move to stop surface 225. This slides gear 222 on shaft 202 in a direction away from partition 180 to activate governor control.

It is important to note that solenoid spring 194 is stronger than governor spring 218, whereupon when solenoid 188 is not energized, plunger extension 192 bears against spool 220 to restrain same in the position illustrated in FIG. 4 wherein the rotary valve 126 is in the position illustrated in FIG. 2, namely, the position where atmosphere is free to pass through the valve to conduit 104 and then to chamber 98 and wherein at the same time suction from the intake manifold is blocked from communication with conduit 104. This is the normal operating condition of the system wherein the balanced pressure on opposite sides of actuator piston 84 enables spring 100 to position piston 84 and piston 68 as illustrated in FIG. 2. In this position, ball valve 64 is unseated to allow fluid pressure to pass directly to the brake line whereupon operation of the brakes is under direct control of brake pedal 12. This condition will remain so long as solenoid 188 (FIG. 4) is not energized. Energization of solenoid 188 is accomplished in the following manner. As previously explained, sudden slowing of gear 170 due to sudden slowing of the vehicle wheels as a result of a skid condition causes cam gear 222 (FIGS. 4, 5, 5A) to move axially on shaft 202 away from partition 180 against the action of spring 230. This movement is sufficient to cause actuation of a switch 234 suitably mounted in chamber 186. At the same time, the initial movement of the brake pedal and the resultant increase in fluid pressure in the system, causes hydraulic switch 18 (FIG. 2) to become closed. Hydraulic switch 18 is fully disclosed and described in copending U.S. patent application Ser. No. 203,075, filed June 18, 1962. Basically, switch 18 comprises piston 236 which has connected thereto at its upper end a metallic contact cup 238. Cup 238 is adapted to bridge contacts 240 and 242 but is normally maintained spaced therefrom by spring 244. An adjusting screw 246 is provided by means of which the tension of spring 244 may be varied, thus enabling the switch 18 to be preadjusted whereby a predetermined fluid pressure, e.g. 120–125 p.s.i., will cause piston 236 to move against the action of spring 244 sufficiently to bridge the contacts 240, 242. Actuation of switch 18 in the aforedescribed manner enables current to flow from battery 248 through contact 242, contact cup 238, and contact 240 to line 250 to the solenoid coil positive terminal 252 (FIG. 4). The voltage is applied through the solenoid coil 254 and then through line 256 to terminal 258 on switch 234. When switch 234 is open, the circuit to ground is not complete and solenoid 188 will not be energized. However, upon actuation switch 234 in the manner aforedescribed, the circuit to ground is completed through terminal 260, line 262 and ground connection 264. It is important to note that the circuit is such that although it is essential for hydraulic pressure switch 18 to be closed in order for solenoid 188 to be energized, closing of switch 18 alone is not sufficient, but rather switch 234 must also be actuated in order to complete the circuit. This is important because under normal operating conditions of the system sufficient pressure will normally be introduced to switch 18 by the foot pedal to actuate same, but it is essential that solenoid 188 not be energized under such normal conditions.

Energization of solenoid 188 accomplished by rightward movement of the cam gear (FIG. 5) closing switch 234, causes plunger 190, 192 to be retracted against the action of spring 194, thus freeing the shaft 200 and spool 220 for axial movement under the influence of the governor assembly. Therefore, the cam gear operating in response to the inertia of the governor and the solenoid operated plunger together can be regarded as an inertia-responsive means for initiating the action of the governor.

As soon as the solenoid plunger has been retracted, due to the sudden slowing at the commencement of a skid condition, the governor assembly takes over control and, as it is stopped by stop surface 225 of the cam gear, spring 218 will cause the governor assembly to commence to collapse, thus moving shaft 200 and spool 220 axially to the left, when viewing FIG. 4. This movement of spool 220 causes corresponding rotary movement of valve 126, thus shutting off the passage of atmosphere to brake control conduit 104 and simultaneously effecting communication between vacuum passage 119 and conduit 104. This results in suction being introduced to chamber 98 which in turn overcomes the action of spring 100 to cause pistons 84 and 68 to move to the left, viewing FIG. 2. This movement of piston 68 enables ball valve 64 to close due to the action of spring 62, thus preventing the introduction of further fluid pressure to the system via brake pedal 12. Further leftward movement of piston 68 enables the fluid in lines 78 and 80 to back up, thereby relieving the pressure until the vehicle brakes begin turning, the duration that the suction is applied, and hence the degree of vacuum and the amount of pressure relief depending on the slipperiness of the road. As soon as the brake release pressure is achieved, the vehicle wheels commence to rotate, whereby drive shaft 142 through the aforedescribed gearing once again causes gears 170 and 222 to rotate, it being apparent that this renewed rotation of shafts 200 and 202 will cause the governor assembly to once again turn, and due to the centrifugal force created, to retract shaft 200 and spool 220 to once again rotate valve 126 to the positions illustrated in FIGS. 2 and 4, where once again atmosphere is connected to chamber 98, thus enabling brake pressure to be restored.

But, it is very important for my present invention that the solenoid is not de-energized and the governor returned to the restraint of the inertia-responsive device. Rather, the governor remains free to act. It leaves the valve 126 open to atmosphere 118 for an instant until the degree of vacuum is lessened enough to cause slight rightward movement of the piston 84 to cause the brake pressure to slightly exceed release pressure and a skid again commences. Again the governor is slowed by the drive train and again it opens the valve 126 to suction 116, and this cycle repeats again and again in an extremely rapid hunting or modulating action with the gas pressure in the conduit 104 never reaching either atmospheric or engine vacuum level, but rather modulates at intermediate levels. In dependent fashion, the hydraulic brake pressure modulates narrowly about the release pressure as a mean, without returning to normal pressure. When the skid condition ends, the governor opens the valve continually to atmosphere and pistons 84 and 86 move fully to the right to once again unseat isolation valve 64 and restore normal brake operation. The faster the vehicle travels, the faster does this action occur, but the action is sufficiently fast down to speeds on the order of 10 m.p.h. and even lower, to rapidly pump and release the brakes. It is another very important aspect of the invention that the governor relinquishes control of the brake pressure before the vehicle stops.

In order to effectively carry out this modulating action, I have found it to be critical, in the preferred construction, that the solenoid 188 remain energized or that the plunger in some other way remains retracted until the vehicle slows to a predetermined slow speed, e.g. 5 or 10 m.p.h., depending on the vehicle. Since closing of switch 234 to complete the circuit to ground that energizes solenoid 188 is only momentary, holding means are provided for maintaining the solenoid energized until hydraulic pressure switch 18 opens, it being understood that switch 18 is preset to open only when fluid pressure in the system falls below the minimum value possible to achieve a skid condition, e.g. set to 85–90 p.s.i. produced by the governor at 5 or 10 m.p.h.

The aforesaid holding means for the solenoid comprise a terminal 266 having a connection to ground as at 268, which terminal is engaged by plunger 190 when the latter is retracted in order to complete the circuit to ground independent of switch 234. Thus, although closing of switches 18 and 234 is essential in order to energize solenoid 188, once the solenoid has been energized and its plunger retracted, switch 234 may be opened without de-energizing the solenoid, and the solenoid will remain energized until switch 18 opens.

As hereinbefore stated, it will be obvious that if switch 18 were not utilized, then there would be no means present for insuring de-energization of the solenoid once the condition has been reached where a skid is no longer possible, it being obvious that if the solenoid were still energized at such low speeds, the vehicle would be without effective brakes, since the governor assembly would not exert sufficient centrifugal force to overcome the action of spring 218 and move shaft 200 and spool 220 to the rightward position (FIG. 4) wherein valve 126 enables the brakes to be controlled by pedal 12.

It is possible for the reset device to take some other form, such as a pendulum device or a vehicle inertia memory system that can detect the slow speed of the vehicle, but brake pressure-sensitive devices, and particularly hydraulic-electric switches have important advantages in the system, particularly since they can respond whenever the skid condition has passed, regardless of the speed of the car, to enable normal operation, while offering low speed protection against the governor's cutting off the brakes completely. The adjustment of the pressure level to which the device responds can be adjusted according to the wishes of the operator and the type of road conditions to be expected. But, in fact, a single setting, below that at which skidding on ice occurs, which is determinable for any given vehicle, is advantageously employed to give anti-skid protection under virtually all conditions.

Any tendency for the unit 24 to erroneously sense a skid condition and actuate switch 234 in response to a rapid deceleration is overcome by use of properly calibrated weights 208 and a properly tensioned spring 230. In addition, I have found that an erroneous sensing is most likely to occur where there is a rapid acceleration of the drive shaft quickly followed by a rapid deceleration. The frictional brake or drag that is resiliently exerted on spool 220 by plunger 190 helps to overcome this problem since this action tends to reduce the torque applied to shafts 200 and 202 by the governor assembly. It has been found, however, that at high speeds the frictional engagement between plunger 190 and spool 220 results in undue wear of the parts. Therefore, plunger 190 is assisted by spring 230, and the plunger is disengaged at high speeds. To this end, stop means 198 engages flange 196 so as to limit the outward movement of plunger 190 whereupon no engagement exists between plunger 190 and spool 220 at relatively high speeds. I have realized that the crucial problem of rapid acceleration followed by rapid deceleration occurs at low speeds in the low gear range with conventional automobiles, and I have, therefore, found that it is not necessary to have plunger 190 exert a frictional drag on spool 220 and shaft 200 at relatively high speeds.

Although the operation of my invention is thought to be clear from the foregoing description, a brief resumé of the operation will now be given. Under normal operating conditions, solenoid 188 is de-energized whereby the spring-loaded solenoid plunger maintains the skid-sensing and control unit inoperative. The de-energized solenoid further insures that rotary valve 126 is in the position wherein atmosphere is introduced to chamber 98. Since chamber 96 is also open to atmosphere, it follows that there is a pressure balance on each side of large piston 84 thus enabling spring 100 to take over and move the piston 84 to the position illustrated in FIG. 2. In this position, piston 68, which is connected to piston 84 and moves therewith, engages ball valve 64 so as to unseat same against the action of spring 62. With ball valve 64 so opened, fluid pumped from master cylinder 14 by brake pedal 12 is free to pass directly to hydraulic lines 78 and 80 to actuate the vehicle brakes. The pressure-sensitive switch is adapted to be closed by a low level of brake pressure, e.g. 120–125 p.s.i., placing the anti-skid unit into readiness for operation.

Upon encountering a skid condition, i.e., a condition wherein the vehicle operator applies more brake pressure than is required for a particular road surface, the vehicle wheels slow suddenly. This causes corresponding deceleration of drive shaft 142, and, through suitable gearing, drive gear 170 and cam gear 222 also slow abruptly. The inertia of the governor assembly causes the gear 222 to move longitudinally by the cam surface aforedescribed, said longitudinal movement of gear 222 causing switch 234 to be closed which results in energization of solenoid 188 and the retraction of solenoid plunger 190. The second switch or terminal 266 is engaged upon retraction of the solenoid plunger to maintain the solenoid energized until switch 18 opens, even though switch 234 has now opened. Switch 18 is preset, e.g. at 85–90 p.s.i. to be opened at a brake pressure below that at which skids can occur, e.g. 100–150 p.s.i. for ice, whereupon solenoid 188 will remain energized until possibility of skidding no longer exists, and the solenoid is then de-energized to restore normal foot brake action before the governor has a chance ever to totally relieve the brakes.

Regarding the operation of the governor, once the solenoid 188 has been energized, the governor control unit takes over. More specifically, when a skid condition is approached, the sudden slowing of the vehicle wheels causes the governor assembly to collapse under the action of spring 218, thus moving shaft 200 and spool 220 to rotate valve 126, this movement now being permitted due to retraction of plunger 190. Rotation of valve 126 blocks the flow of atmosphere to chamber 98 and simultaneously allows the introduction of a vacuum to said chamber. The introduction of vacuum overcomes spring 100, thus resulting in movement of pistons 84 and 68 to the left, viewing FIG. 2. This movement closes isolation valve 64, thus preventing the application of further fluid pressure by brake pedal 12. As the valve remains in this position, the degree of vacuum increases, causing further leftward movement of piston 68 (FIG. 3), so that pressure in lines 78 and 80 and the brakes are relieved. A point is reached when the brakes are relieved sufficiently to allow the wheels to speed up from their slowed condition, the degree of relief required depending on the degree of slipperiness of the road. Then shafts 200 and 202 speed up once again, whereby the governor assembly retracts shaft 200 and spool 220 to once again rotate valve 126 to the position where atmosphere is introduced to chamber 98 and the piston 68 moves to the right and increases the brake pressure, until a part is reached where the wheels slow again and the cycle repeats. This action continues in a hunting manner so long as the vehicle is in an incipient skid, thus insuring that maximum brake pressure is continually applied to the wheel brakes short of pressure that would cause locking of the wheels. Once the brake pedal is released or the brake pressure in the system has dropped below the minimum possible value to create a skid, hydraulic pressure switch 18 breaks the circuit to solenoid 188, whereupon the latter becomes de-energized and the brakes once again become under complete control of the operator.

It is important to note that although loss of vacuum in the vehicle system will render the anti-skid means ineffective, said loss of vacuum will in no way affect normal operation of the vehicle brakes. Also, it is important to note that this system can be used with foot pedal controlled brakes of both the powered and nonpowered types.

While a spring-loaded fly ball type of governor has been illustrated, and is presently preferred, the broad concept of the invention include the use of other governors, all rotary weight governors, such as gravity loaded fly ball, centrifugal shaft and inertial shaft governors, as well as governors that operate through electrical action.

The concepts are likewise applicable to other brake systems including air brakes in which valve 126 could directly modulate air brake pressure. Likewise it is possible to separate the governor from the valve, let the governor actuate a switch and let the valve be actuated by a solenoid responsive to the condition of the switch.

While use with engine vacuum is very efficient and inexpensive, and unlike previous systems I have proposed, does not cause the engine to run roughly due to loss of vacuum, the invention is applicable to other sources of pressure differential, incompressible fluid as well as gaseous fluid and numerous aspects of the invention are useful with nonfluid types of brake systems.

Referring now to FIGS. 7 and 8, a slightly different form of my invention is disclosed in which the relieving device is incorporated as an integral part of a power brake unit. The system generally comprises a brake pedal 300, a master cylinder 302, an accumulator 304, a safety valve 306, a hydraulic pressure switch 308, a power brake control unit 310, and an anti-skid unit 312.

Actuation of brake pedal 300 operates piston 314 to pump fluid from cylinder 316 to conduit 315. Master cylinder 302 further comprises a fluid reservoir 320 communicating with cylinder 316 by means of passageway 322. A conduit 324 extends from reservoir 320, the function of which will hereinafter be described. Accumulator 304 is in communication with conduit 318 and comprises a spring loaded piston 326 and acts as a cushion and shock absorber for the fluid system where variations in fluid pressure occur.

During normal operation of the vehicle with which the power brake unit is associated, and with the brakes in their non-actuated position, the power brake unit 310 is in the position illustrated in FIG. 8. In this position, chambers 328 and 330 of cylinder 332 are both under vacuum, thereby equalizing the pressure on opposite sides of piston 334. This enables spring 336 to urge the piston 334 to the leftward position illustrated, said piston 334 being connected by means of rod 338 to a brake actuating piston 340. Piston 340 is slidably mounted in cylinder 342, said cylinder having an outlet conduit 344 leading to safety valve 306. Conduit 344 is also in communication with hydraulic pressure switch 308.

A supply of hydraulic fluid is located in cylinder 342 whereupon movement of piston 334 against the action of spring 336, and corresponding movement of piston 340 will force fluid from cylinder 342 under pressure through conduit 344 and with valve 366 in the position illustrated in FIG. 8 to conduit 346 and then to hydraulic lines 348 which lead to the wheel cylinders (not shown) of the vehicle's braking system. Thus it will be seen that movement of pistons 334 and 340 to the right, viewing FIG. 6, will cause operation of the vehicle brakes.

As hereinbefore indicated, under normal operating conditions of the vehicle, and with the brakes not applied, pistons 334 and 340 are in the position illustrated in FIG. 8 due to the fact that a vacuum exists in both chambers 328 and 330. More specifically, suction from the intake manifold 360 of the vehicle passes through conduit 352 into chamber 330 and then through passageway 354, through openings 356 in diaphragm 358 to conduit 360, through rotary valve 362 of the anti-skid unit 312, through conduit 364 and then to chamber 328. The control unit generally shown at 366 which forms a part of power brake unit 310 is of conventional form and comprises the aforesaid diaphragm 358, hydraulically movable by means of piston 368 to a closed position wherein the diaphragm engages the fixed seat 370 to block communication between passage 354 and conduit 360. The piston 368 also controls movement of poppet valve 372 normally maintained closed by spring 374. Spring 376 normally urges diaphragm 358 to its open or unseated position, as illustrated in FIG. 8. An atmosphere intake is located at 378, and introduction of atmosphere into the system is controlled by valve 372 in a manner now to be described.

As above indicated, with the parts in the positions illustrated in FIG. 8, the brakes of the vehicle are non-operative due to the fact that suction is free to circulate through conduit 352 to chamber 330 and then through control unit 366 to conduit 360, through rotary valve 362 to conduit 364 and then to chamber 328. With vacuum on both sides of piston 334, spring 336 maintains the piston 334 and the connected brake actuating piston 340 in brake release position. Upon actuation of brake pedal 300 by the operator, pressurized fluid passes through conduit 318 to conduit 380. With the safety valve 306 in the position illustrated, flow of the fluid into the valve is blocked, and hence the brake fluid is forced to flow through conduit 380 into the brake control unit 366. None of the fluid from the pedal is allowed to reach the brake actuators at 348.

Introduction of the pressurized fluid to the brake control unit 366 causes actuation of piston 368 to move diaphragm 358 to its closed or seated position and to simultaneously open poppet valve 372 in a conventional manner. This movement blocks communication between chamber 330 and conduit 360 and simultaneously allows air to enter through inlet 378 through the now open valve 372 to conduit 360. The atmosphere circulates around conduit 360 through valve 362 to conduit 364 and then the chamber 328. The introduction of atmospheric pressure to chamber 328 creates a pressure differential which overcomes spring 336 and moves piston 334 and piston 340 to brake actuating position. More specifically, the movement of piston 340 in cylinder 342 forces the brake fluid through conduit 344 and safety valve 306 to conduit 346 and hydraulic brake lines 348 to actuate the vehicle brakes in known fashion.

In order to insure that there is always an adequate supply of brake fluid in cylinder 342, conduit 324 connects fluid reservoir 320 to the cylinder 342, it being important to note that the inlet 382 to the cylinder 342 is located behind the forward portion of piston 340. Piston 340 is provided with a one-way valve 384 which enables fluid to pass through the piston from left to right, viewing FIG. 8, but which blocks flow of fluid through the piston from right to left. Thus, during operation of the piston 340, the suction created thereby in cylinder 342 sucks fluid through conduit 324 from reservoir 320 into cylinder 342 on the rear side of piston 340. During the return stroke of piston 340, the valve 384 allows fluid to pass through the piston, thereby insuring that there is always a full supply of fluid in the cylinder for brake actuation.

Since the structure and operation of hydraulic pressure switch 308 and anti-skid unit 312 are identical to that already described in connection with the first form of my invention, it is not thought that further description is necessary. It will be noted, however, that where the operator applies more brake pressure than is required for a particular road surface, the vehicle wheels will lock, whereby the same structure and operational sequence will cause rotary valve 362 to be moved to a position wherein conduit 360 becomes blocked and conduit 352A becomes open to allow suction from manifold 350 to be introduced through conduit 364 to chamber 328, whereupon spring 336 will once again take over to release the brakes. The same modulating action as aforedescribed will take place until hydraulic pressure switch 308 eventually renders the anti-skid inoperative.

In accordance with my invention it is crucial that the entire brake pressure be controlled by the anti-skid unit and that no fluid be conducted directly from the foot pedal to the wheels. Means are provided to insure that brake pressure will not be lost should there be a loss of suction. This is accomplished by safety valve 306. More specifically, conduit 352B is connected to the suction conduit 352 whereupon as proper suction exists in the system, piston 386 is maintained in the position illustrated in FIG. 8 against the action of spring 388. In this position, conduit 344 is in communication with conduit 346, but conduit 380 is blocked at its extremity adjacent the safety valve. Should suction be lost in the system, spring 388 will become effective to move piston 386 upwardly, thereby blocking the communication between conduits 344 and 346 and at the same time providing communication between conduit 380 and conduit 346. With the safety valve in this position, the brakes are directly controlled by operation of pedal 300 since the entire power unit is now bypassed.

A one-way check valve 390 is located in conduit 352 adjacent the intake manifold 350 since without same backfire of the vehicle engine would cause an explosive pressure to be introduced to the power unit, which would be undesirable for obvious reasons.

Referring once again to FIG. 4, it will be noted that should the vehicle move in reverse, the direction of rotation of drive shaft 142 will likewise be in reverse, thus causing reverse rotation of flexible shaft 164 and shaft 168. Reverse rotation of shaft 168 will, in turn, cause reverse rotation of drive gear 170 and cam gear 222, causing pin 228 to leave stop surface 227 and move toward stop surface 225, which, as previously described, causes gear 222 to slide on shaft 202 in a direction away from partition 180 to close switch 234 and thus activate the governor control and anti-skid means. Even though it is possible that very slow reverse movement of the vehicle might not be sufficient to cause movement of cam gear 222 to activate the governor control, the fact remains that there is always the possibility and even likelihood that reverse movement of the vehicle will activate the governor control even though no skid condition exists. Since there is no practical need for any anti-skid means when the vehicle is moving in reverse, and since the activation of these means when not needed might even result in the loss of some stopping distance, it has been found desirable to provide means for rendering the governor control and anti-skid ineffective and inoperative when the vehicle moves in reverse.

Referring to FIGS. 9 through 12, a somewhat, modified anti-skid unit is shown generally at 400. Unit 400 is basically the same as skid-sensing and control means 24 hereinbefore described except that a reverse cut-off switch has been incorporated in the unit to prevent energization of solenoid 188 when the vehicle drive shaft is in reverse and flexible shaft 164 correspondingly rotates in a reverse direction. The reverse cut-off switch, shown generally at 402 (FIG. 10) comprises a shaft 404 slidably coupled to shaft 164 as at 406, in the same manner that shaft 168 was drivingly engaged to flexible shaft 164. Shaft 404, which is constructed of any electrically conductive metal, is journalled in bore 408, said bore having an enlarged end portion 410, it being understood that the larger diameter of portion 410 results in the presence of an annular shoulder 412 at the extremity of bore 404. Slidably mounted in portion 410 is a contact button 414, said button being resiliently urged toward bore 404 by means of spring 416. The opposite end of spring 416 resiliently engages a contact cup 418 having a terminal 420 extending radially therefrom.

Adjacent its opposite extremity, shaft 404 has fixedly mounted thereon the afore-described drive gear 170, said gear meshing with cam gear 222, all in the manner hereinbefore described. A spring 422 engages washer 424 to normally urge shaft 404 to the left when viewing FIGS. 9 and 10, thus causing the end of shaft 404 to extend into enlarged portion 410 and, therefore, into engagement with contact button 414, as illustrated in FIG. 9. Loosely mounted on shaft 404 is a reverse switch cam 426 comprising a circular plate 428 having a spiral cam portion 430 mounted thereon, and further having an outwardly extending pin 432 located adjacent the end of cam track 430. A cam pin 434 extends radially from shaft 404 and is adapted to cooperate with the spiral cam track 430 to determine the axial position of shaft 404. Expressed differently, when shaft 404 is rotating in a counterclockwise direction when viewing FIG. 12, cam pin 434 will engage the stop pin 432 at the low point on the spiral track 430. With the parts in this position, shaft 404 will assume the position illustrated in FIG. 9 wherein the extremity of the shaft is in engagement with contact button 412, it being understood that spring 422 is somewhat stronger than spring 416, whereupon the extremity of shaft 404 will actually enter into enlarged portion 410. Upon clockwise rotation of shaft 404, pin 434 will ride up the spiral cam track 430 until it reaches the high end of said track and engages the opposite side of stop pin 432, as illustrated in FIG. 10. In this position, shaft 404 has been moved to the right (when viewing FIG. 10) against the action of spring 422 sufficiently for the end of said shaft to become completely withdrawn from enlarged portion 410. Since the annular shoulder 412 prevents the contact button 414 from moving out of enlarged portion 410, it follows that the end of shaft 404 becomes disengaged from contact button 414, as clearly illustrated in FIG. 10. Also mounted on shaft 404 is a washer 436 having a radially extending contact arm 438, the purpose of which will hereinafter be described. As will be seen most clearly in FIG. 10, the washer 436 is mounted on shaft 404 adjacent the flat rear surface of cam 426, it being understood that shaft 404 may freely rotate within washer 436. A cam thrust washer 440 comprising a peripheral ring portion 442 and bent marginal lugs 444 resiliently engages the opposite face 428 of cam 426, whereupon to resiliently urge cam 426 into engagement with washer 436 and at the same time to impart a sufficient frictional drag on cam 426 so that movement of shaft 404 will not impart corresponding rotary movement to the cam until pin 434 moves into engagement with stop pin 432. The thrust washer 440 has a radially extending spring arm 446 that is secured to the housing 176 by any suitable means, such as by having the end of the spring arm clamped between adjacent portions of the housing, as illustrated in FIGS. 9 and 10.

The operation of reverse switch 402 is as follows. Assuming that shaft 404 is being rotated in a counterclockwise direction, which for purposes of this description correspond to forward movement of the vehicle, the switch will, as aforestated, assume the position illustrated in FIG. 9 wherein shaft 404 is making engagement with contact button 412. With the parts in this position, and assuming that a skid condition commences to exist, causing cam gear 222 to close switch 234, current will flow through line 262 to terminal 420 through contact cup 418, spring 416, contact button 414, and then to shaft 404, which as previously described, is in engagement with contact button 414. Shaft 404 is in turn in electrical engagement with washer 436 and its radially extending terminal 438, both directly and through the engagement of pin 434, which in turn engages cam 426, which in turn bears against washer 436. Thus, the flow of current is through terminal arm 438 and then to line 262A, which connects to ground as at 264. This, along with line 256, completes the circuit to solenoid 188 in order to energize same and render the governor control effective, all in a manner hereinbefore described. On the other hand, should the vehicle move into reverse, thus resulting in clockwise rotation of shaft 404, cam 426 will cause the shaft 404 to retract and become disengaged from contact button 414, as illustrated in FIG. 10, thus interrupting the connection to ground and preventing energization of solenoid 188. It will thus be seen that whenever the vehicle and its drive shaft moves in reverse, the reverse cut-off switch 402 will automatically prevent the skid sensing and control means and the governor control from coming into play. Thus, the vehicle brakes will always be under normal and direct control by the operator whenever the vehicle is moving in reverse.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

I claim:

1. A power brake system for motor vehicles comprising a plurality of hydraulic brake actuators, a master cylinder having a fluid supply therein, means for causing fluid to be pumped from said master cylinder, a power brake unit having a first cylinder and piston means dividing said cylinder into vacuum and pressure chambers, a source of vacuum connected to said vacuum chamber, a first conduit extending from said vacuum chamber to said pressure chamber, a control valve movable between a first position wherein suction from said vacuum side is free to communicate with said pressure chamber to evacuate same and a second position wherein atmospheric pressure is introduced to said conduit for entry to said pressure chamber, resilient means operative to bias said first piston to a first position when both chambers are evacuated, said first piston being movable to a second position against the action of said resilient means when atmospheric pressure is introduced to said pressure chamber, means for moving said control valve between its first and second positions in response to the pumping of fluid from said master cylinder, a second cylinder and piston, said second cylinder having a supply of fluid therein, a line connecting said second cylinder to said brake actuators whereby actuation of said second piston forces fluid under pressure to said brake actuators to operate same, means connecting said first and second pistons whereby movement of said first piston from its first to second position causes actuation of said second piston, a line connecting said second cylinder to said master cylinder, whereby the suction created by actuation of said second piston automatically draws fluid into said second cylinder from said master cylinder, and a one-way valve in said second piston for allowing fluid to pass therethrough as said second piston returns to its inoperative position, thereby insuring at all times an adequate supply of fluid in said second cylinder and anti-skid means for controlling fluid communication between said vacuum chamber and said pressure chamber upon initiation of a skid condition by the motor vehicle, said last named means being interposed between said control valve and said pressure chamber.

2. A power brake system for motor vehicles comprising a plurality of fluid brake actuators, a master cylinder having a fluid supply therein, means for displacing the fluid in said master cylinder, a brake control unit fluidly connected to said master cylinder and actuable by said displacing means, a first cylinder, a first piston mounted for endwise sliding movement in said first cylinder, means for fluidly connecting one side of said first piston to said brake actuators, means for actuating said first piston to move said first piston in a first direction to transmit fluid pressure to said fluid brake actuators, said last named means including said brake control unit and said fluid displacing means, a second cylinder, a second piston mounted in said second cylinder to divide said second cylinder into a first pressure chamber and a second pressure chamber, means for operatively connecting said first piston with said second piston, a first pressure source and a second pressure source, means for fluidly connecting said first pressure source with said first pressure chamber, said brake control unit including means for providing fluid communication between said second chamber of said second cylinder and said first pressure source when said brake control is not actuated, the difference in pressure between the two chambers causing said second piston to move in a direction to urge said first piston to move in the first direction, means for biasing said first piston in a second direction which is opposite to that of its first direction when both chambers of said second cylinder are in fluid communication with said first pressure source, means for closing fluid communication between said first pressure source and said second pressure chamber and placing said second pressure chamber in fluid communication with said second pressure source upon actuation of said brake control unit, and means interposed between said brake actuators and said first piston for providing direct fluid communication between said master cylinder and said fluid brake actuators upon a failure of said first pressure source to provide the pressure necessary to operate said second piston, whereby when said fluid displacing means is actuated fluid pressure is transmitted to said brake control unit thereby to actuate the brake control unit and close fluid communication between said first pressure source and said second chamber and open fluid communication between said second chamber and said second pressure source whereby said bias means is overcome and said first piston is moved in the first direction to apply fluid pressure to said brake actuators and whereby upon actuation of said means interposed between said brake actuators and said first piston the actuation of said fluid displacing means causes fluid pressure to be transmitted directly from said master cylinder to said brake actuators.

3. A power brake system as set forth in claim 2 wherein said means interposed between said brake actuators and said first piston includes a valve, means for actuating said valve to a first operating position to provide direct fluid communication between said fluid brake actuators and said first piston for actuating said valve to a second operating position cutting off the direct fluid communication between said fluid brake actuators and said first piston and opening direct fluid communication between said fluid brake actuators and said master cylinder.

4. A power brake system as set forth in claim 3 wherein said valve includes a housing formed with a piston receiving channel and a piston formed with spaced longitudinal grooves and mounted for endwise movement in said channel between a first position in said first valve operating position and a second position in said second valve operating position and said valve positioning means includes a spring adapted to bias said valve piston toward said second position, means for providing fluid communication between one end of said piston and said first pressure source and means for providing fluid communication between the other end of said piston and said second pressure source whereby in said first valve operating position said first and second pressures cooperate to overcome said spring bias to hold said valve piston in said first position but upon a failure of the first pressure said spring acts to move said valve piston to said second position.

5. A power brake system as set forth in claim 2 including anti-skid means for controlling fluid communication between said second pressure chamber and said first and second pressure source upon actuation of said fluid displacing means and said anti-skid means, said anti-skid means being interposed between said brake control unit and said second pressure chamber.

6. A power brake system as set forth in claim 5 wherein said anti-skid means includes means for sensing a predetermined deceleration of a wheel of the motor vehicle and means actuated by said sensing means for alternately removing fluid communication between said second pressure chamber and said second pressure source and opening fluid communication between said second pressure chamber and said first pressure source.

7. A power brake system as set forth in claim 6 including means for removing from the motor vehicle operator control of the amount of the fluid pressure applied to the brake actuators upon actuation of said said sensing means, whereby fluid pressure for said brake actuators is alternately applied and relieved while control of the amount of fluid pressure applied to the brake actuators is removed from the operator.

8. A power brake system as set forth in claim 7 wherein said means interposed between said brake actuators and said first piston includes a valve, said valve including a housing formed with a piston receiving channel and a valve piston formed with a pair of spaced longitudinal grooves and mounted for endwise movement in said channel between a first position and a second position, means for moving said valve piston to the first position to provide fluid communication between said fluid brake actuators and said first piston and for moving said valve piston to the second position to cut off fluid communication between said fluid brake actuators and said first piston and open direct fluid communication between said fluid brake actuators and said master cylinder, said last named means including means for providing fluid communication between one end of said valve piston and said second pressure source and for providing fluid communication between the other end of said valve piston and said first pressure source and a spring adapted to bias said valve piston toward the second valve piston position, whereby in said first valve piston position said first and second pressures cooperate to overcome said spring bias to hold said valve piston in the first position but upon a failure of the first pressure said spring acts to move said valve piston to said second position.

9. A power brake system as set forth in claim 8 wherein said means actuated by said sensing means includes valve means, said valve means including a housing and a rod formed with a pair of axially spaced bores and mounted for rotation within said housing between a first position and a second position, said housing formed with a first compartment in fluid communication with said second pressure chamber, a second compartment in fluid communication with said brake control unit and a third compartment in fluid communication with said first pressure source, said rod being formed and mounted in said housing to provide fluid communication between said first compartment and said third compartment only in the first rod position and to provide fluid communication between said first compartment and said second compartment only in the second rod position.

References Cited
UNITED STATES PATENTS

| | | | |
|---|---|---|---|
| 2,654,224 | 10/1953 | Price | 60—54.6 |
| 2,935,164 | 5/1960 | Martin et al. | 60—54.5 X |
| 2,947,387 | 8/1960 | Price | 60—54.5 X |
| 3,076,315 | 2/1963 | Hager | 60—54.5 |
| 3,103,786 | 9/1963 | Hager | 60—54.6 |
| 3,200,579 | 8/1965 | Thirion | 60—10.5 |

MARTIN P. SCHWADRON, *Primary Examiner.*

ROBERT R. BUNEVICH, *Examiner.*